United States Patent Office 2,733,146
Patented Jan. 31, 1956

2,733,146

METHOD FOR ENSILING VEGETABLE AND ANIMAL PRODUCTS

Torsten Gustaf Holst, Halsingborg, Sweden, assignor to Reymersholms Gamla Industri Aktiebolag, Halsingborg, Sweden, a company of Sweden No Drawing. Application February 16, 1953, Serial No. 337,251

5 Claims. (Cl. 99—8)

During the last few decades there has been a trend towards the preserving of different kinds of forage plants, especially from pastures and hayfields, by so-called acidulation or ensiling. Several different methods have been proposed and tested in all of which there is a common distinctive feature in that the forage in a more or less moist state is packed or stored under pressure whereby air is expelled and excluded from the plant material.

The safest method of avoiding harmful alterations in the forage crops such as the decomposition of proteins and the formation of butyric acid, consists in adding acid substances to give the plant material such a high acidity that the plants rapidly die and the harmful microorganisms are unable to develop.

According to the so-called A. I. V.-method which since the early 1930's has had it principal use in the northern countries (Finland, Denmark, Norway, Sweden), acidification has been effected by means of strong acids (a mixture of hydrochloric acid and sulfuric acid). In the U. S. A. the silage of grass and legumes has been made to a great extent for several years by the addition of phosphoric acid, while, especially during the last World War, in Germany and Switzerland formic acid has been used with good results. According to the A. I. V.-method the aim is to achieve an optimum pH value between 3.5 and 4.0 and preferably between 3.7 and 3.8 in the silage, while by the use of phosphoric acid and formic acid the acidity reached is lower and on an average seems to correspond to pH values between 4.0 and 4.5.

The possibility of making first class silage with proportionately small additions of the last named relatively weak acids deserves attention. A greatly contributive reason for the success of these methods has no doubt been the fact that it has now been understood and taken into consideration to a much greater extent than earlier that it is important that the plants are at an early stage of their growth as well as chopped and possibly wilted. In this connection the early primitive pit-silos have been replaced to a very great extent by solid tower-silos made of concrete.

For a long time it has been a problem of current interest to make it possible to replace the acids (A. I. V.-acid, phosphoric acid and formic acid) by solid materials and thereby to eliminate various practical difficulties in ensiling. Virtanen has suggested the use of sodium bisulfate as an example of an acid salt to be used for making silage. This salt, however, seems never to have attained any practical importance, probably due to the fact that too large a quantity thereof which is physiologically unfavourable for the animals is required for obtaining immediately the low pH values (between 3 and 4) in the forage which are stated to be characteristic of the A. I. V.-method. Different salts of phosphoric acid and formic acid have also been recomended in the patent literature as ensiling additions, but in these cases the acidity of the salts in question have as a rule been considerably less than the acidity of the sodium bisulfate.

The present invention has for its object to provide a composition of acid salts of phosphoric acid and sulfuric acid which when added in moderate quantities to the plant material will rapidly give rise to such an acidity, corresponding to a pH value of about 4 or somewhat higher, but less than 4.5, by which harmful microbiological processes are impeded while on the other hand the desired anaerobic lactic acid fermentation may proceed under favourable conditions. In any case pH should exceed 3.5.

The invention resides in a method for ensiling vegetable and animal products, which comprises, adding to the material to be ensiled a composition containing a salt combination satisfying the general formula $$MeH_5(PO_4)_2.nMeHSO_4$$

wherein Me is a member of the group Na, K, and $NH_4$, separately or in combination, and $n$ any numerical value from 1 to 3 inclusive. The sodium compounds are preferred.

By mixing with the forage material such an acid salt combination having a considerable buffer capacity it is possible with proportionally small quantities of such salts, e. g. 1 to 2% of the weight of the forage material, to give the material a pH value of about 4, which value remains substantially constant during the ensiling.

The presence of phosphoric acid in the above-mentioned salts serve to promote the lactic acid formation in a favorable pH range as well as providing for the general phosphorus need of the animals.

The said salts, e. g. the sodium salts $$NaH_5(PO_4)_2.nNaHSO_4$$

may be produced in a dry form, suitable for spreading, in a technically advantageous manner by converting anhydrous mono sodium ortho-phosphate and/or di sodium ortho-phosphate with concentrated sulfuric acid in the required proportions, which by way of example is apparent from the following reaction formulas.

(1) $2NaH_2PO_4 + H_2SO_4 \rightarrow$
 $NaH_5(PO_4)_2.NaHSO_4$ (18.3% P)

(2) $NaH_2PO_4 + Na_2HPO_4 + 2H_2SO_4 \rightarrow$
 $NaH_5(PO_4)_2.2NaHSO_4$ (13.5% P)

(3) $2Na_2HPO_4 + 3H_2SO_4 \rightarrow$
 $NaH_5(PO_4)_2.3NaHSO_4$ (10.7% P)

Other methods are of course possible. Thus the salts in both of Formulas 2 and 3 may be produced from a mixture of concentrated sulfuric acid, anhydrous sodium sulfate and anhydrous mono sodium ortho-phosphate in suitable proportions.

The acid salt for ensiling, the chemical composition of which is represented by the formula $$NaH_5(PO_4)_2.NaHSO_4$$

besides its high content of phosphorus (18.3% P) also shows a high buffer capacity in the suitable acidity range for ensiling (about pH 4) and has also an appreciable stimulating effect on the lactic acid formation. This salt has been tested with excellent results in ensiling experiments on a large scale. When, in the ensiling operation, the percentage of the total solids of the plant material was within the range from 24% to 18%, salt additions within the range from 1 to 2% gave a well preserved and palatable silage. For grass-clover mixtures, which are relatively easily ensiled, a salt addition of 1% may normally be regarded as sufficient, while for plant materials rich in lucern or alfalfa, salt additions within the range from 1.5 to 2% are recommended. The losses of organic substance and crude protein are of the same low order as by ensiling with A. I. V.-acid and formic acid and in some cases still lower, and the utilization of sugar for the lactic acid formation is remarkably good. As in the A. I. V.- and formic acid methods the percentage of butyric acid is low.

Under certain circumstances the quantity of phosphorus introduced into the silage with the salt, $$NaH_5(PO_4)_2 \cdot NaHSO_4$$

seem to exceed the quantity commonly considered to be physiologically most favorable. When there is a high water content in the ensiled plant material, e. g. total solids of 15–16% or lower, a considerable quantity of phosphate passes away with the press-juice running off. By proper selection from the salts disclosed above and combinations thereof which contain phosphorus within the range from about 10% to about 18% one may produce any desired acidity and buffer action and spreadability. As the percentage of phosphorus of the plant material to be ensiled varies, the quantity of added phosphorus may be varied by using an appropriate one of said salts or combination thereof. Thereby the phosphorus concentration in the silage may be advantageously adapted to the needs of the animals.

As compared with the many earlier proposed and strongly acid ensiling compositions, the above mentioned acid salts are not highly hygroscopic or corrosive, and may therefore, without difficulty, be packed and stored in sacks of suitable resistant material, such as plastic material or plastic-impregnated kraft-paper, and may be handled without any particular precaution. It is consequently a characteristic of the invention that the salt or salt composition can be merchandised in dry or solid state and supplied to the material to be ensilaged by spreading in dry state or, if desired, in the form of a solution made at the place of ensiling. The working technical advantages of ensiling with the salts here proposed, in comparison with, for instance, the A. I. V.-method, are so considerable, that they compensate for the work which may be required for chopping and tightly packing the forage.

Besides common field and ground plants also other vegetable and animal fodder materials, such as potatoes, root-crops and root-crop leaves as well as fish and meat waste, may be ensiled by the use of the above mentioned salts. The press-juice which may flow off from the ensilage may, if desired, be used for preserving, for instance, urine. Finally, these strongly acid salts may be directly used for binding the ammonia of urine, animal excrements, and other animal waste products.

The following example is intended to illustrate the preserving effect achieved with these acid salt additions in ensiling field plant materials which are difficult to process. The plant material containing 60% of alfalfa, 30% of clover and 10% of grass had a content of total solids (dry substance) of 16.6% and had been harvested in an early stage of growth and chopped before the ensiling. After about three months the silages were taken out and analysed.

The following table shows the results of comparative tests, (a) without addition, (b) with the addition of 9 litres of 1.7 n A. I. V.-acid per 100 kgs. of forage, and (c) and (d) with the addition of 1.5% and 2%, respectively, of the acid salt $NaH_5(PO_4)_2 \cdot 2NaHSO_4$.

*Silage quality in comparative tests*

| | Test | pH | Ammonia-nitrogen in percent of total nitrogen | Lactic acid, percent | Acetic acid, percent | Butyric acid, percent |
|---|---|---|---|---|---|---|
| a | Without addition | 5.7 | 31.5 | 0.50 | 1.25 | 0.45 |
| b | A. I. V. acid | 4.0 | 8.8 | 0.97 | 0.50 | 0.10 |
| c | 1.5% salt | 4.3 | 10.7 | 1.17 | 0.75 | 0.12 |
| d | 2% salt | 4.0 | 9.6 | 1.26 | 0.53 | 0.03 |

It may here be observed that the important lowering in pH value, which is reached by the additions of 1.5–2% of the acid salt according to the invention and the excellent preserving effect thereby attained, are comparable with the result obtained with the A. I. V.-acid. Furthermore the quality statistics of the above table show that the silage made without addition was of a very bad quality with a high loss of protein and a high content of butyric acid.

I claim:

1. A method for ensiling vegetable and animal forage materials, which comprises adding to the material to be ensiled a composition consisting essentially of a salt combination satisfying the general formula $$MeH_5(PO_4)_2 \cdot n MeHSO_4$$

wherein Me is a member of the group Na, K, and $NH_4$ and $n$ is a numerical value within the range from 1 to 3.

2. A method as claimed in claim 1, in which the salt containing composition is added in such a quantity that a pH value within the range from 4.0 to 4.5 is produced in the juice present in contact with the solids of the forage material.

3. A method as claimed in claim 1 in which the composition consists essentially of a mixture of salts.

4. A dry composition for ensiling vegetable and animal forage materials, said composition consisting essentially of a salt combination satisfying the general formula $MeH_5(PO_4)_2 \cdot n MeHSO_4$, wherein Me is a member of the group consisting of Na, K, and $NH_4$ and $n$ is a numerical value within the range from 1 to 3.

5. A composition as claimed in claim 4 consisting essentially of a mixture of salts.

References Cited in the file of this patent

UNITED STATES PATENTS

| 1,935,754 | Virtanen | Nov. 21, 1933 |
| 2,346,072 | Haskell | Apr. 4, 1944 |